United States Patent [19]

Pacht

[11] 3,765,607
[45] Oct. 16, 1973

[54] HIGH PRESSURE FLUID SYSTEM AND NOZZLE AND VALVE ASSEMBLY THEREFORE

[75] Inventor: Amos Pacht, Houston, Tex.
[73] Assignee: Partek Corporation, Houston, Tex.
[22] Filed: Aug. 4, 1972
[21] Appl. No.: 278,113

[52] U.S. Cl............ 239/124, 239/445, 181/36 D, 181/53
[51] Int. Cl............................................. B05b 9/00
[58] Field of Search................. 239/443, 444, 445, 239/446, 447, 124

[56] References Cited
UNITED STATES PATENTS
3,672,575   6/1972   Hinrichs.......................... 239/445
3,608,824   9/1971   Ballou.............................. 239/124

FOREIGN PATENTS OR APPLICATIONS
691,779   5/1953   Great Britain.................... 239/444

Primary Examiner—Allen N. Knowles
Attorney—W. F. Hyer et al.

[57] ABSTRACT

A fluid system for supplying a high pressure stream of fluid is disclosed in which a novel, hand-held nozzle and valve assembly is provided for controlling the flow of fluid from a high pressure pump to a nozzle. The assembly includes a valve housing having a pressure relief or dump outlet and a valve member which is movable between a position in which fluid is dumped or relieved through the pressure relief outlet to a position where substantially all of the fluid flow is through the nozzle. A flat, fluted valve member is utilized to minimize wear, and misalignment and to conserve space. Means, such as a muffler, is provided for diverting the fluid flowing through the pressure relief outlet in such a manner to substantially reduce kick of the assembly when the pressure in the valve housing is relieved. The assembly is also arranged to permit use of different types of operating handles with the same valve housing.

19 Claims, 8 Drawing Figures

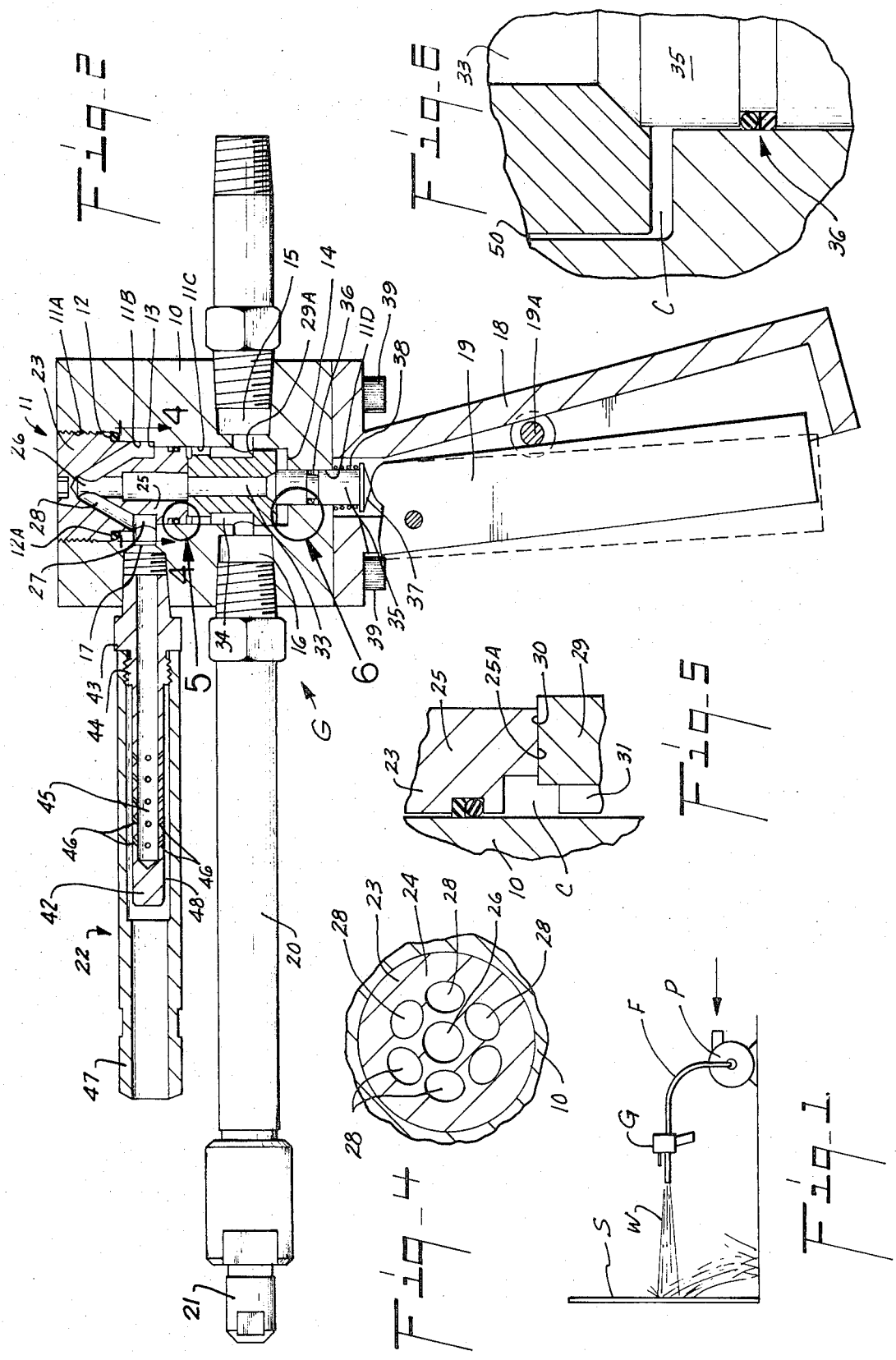

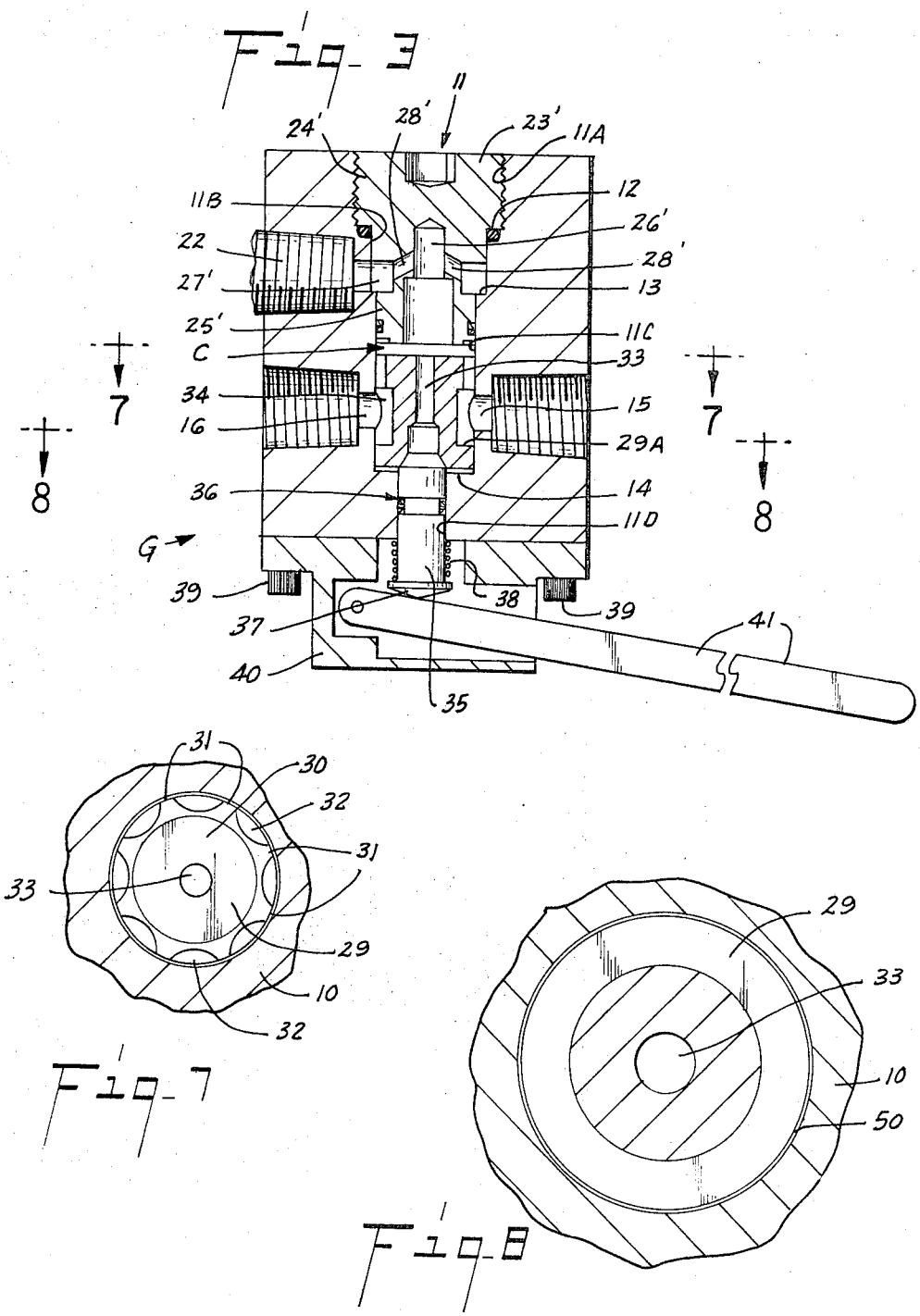

HIGH PRESSURE FLUID SYSTEM AND NOZZLE AND VALVE ASSEMBLY THEREFORE

This invention relates to a high pressure fluid system and in one of its aspects to a novel, hand-held nozzle and valve assembly for use in such a system to control flow of fluid through a nozzle.

In the prior art, fluid systems are provided in which a high pressure stream of water, i.e., at pressures of 6,000 – 10,000 pounds or more, are used for many cleaning applications. In many of these systems a hand-held nozzle and valve assembly (somewhat like a gun with a nozzle at the end of the barrel) is provided, and it is connected by a hose to the outlet of the high pressure pump. The nozzle and valve assembly generally includes a valve housing, a barrel extension for directing the stream of water to the object to be cleaned and through the nozzle, a handle trigger mechanism, and a pressure relief or dump outlet for relieving pressure in the valve housing when flow through the high pressure nozzle is interrupted. In order to reduce the danger present from "kick" of the assembly when the pressure is relieved, the pressure relief outlet is generally directed downwardly. However, this arrangement causes the dumped water to be directed at the feet of and close to the operator, and also requires that the triggering mechanism for the valve assembly be something other than a pistol-grip type of mechanism, such as an elongated bar or lever handle extending from the valve assembly towards the operator. The pistol-grip type of mechanism is preferred since it makes it easier for the operator to both hold and trigger the assembly, although it is desirable that the assembly be adapted for use with both types of handles mentioned.

Also, in such high pressure fluid systems the parts used in the control valves are, primarily because of the high velocity of water, subject to rapid wear and frequent replacement. Also, rounded or tapered valve seats are generally employed which are subject to frequent misalignment or leakage in such an environment. Also, many prior art valve constructions are cumbersome and employ numerous parts subject to wear.

It is thus an object of this invention to provide a hand-held nozzle and valve assembly for a high pressure fluid system in which dumped water is directed away from the operator, but in which kick is substantially reduced.

Another object of this invention is to provide such a nozzle and valve assembly in which rounded or tapered valve seats are not employed, and in which a relatively small number of parts may be employed in a relatively small, symmetrical housing.

Another object of this invention is to provide such a nozzle and valve assembly in which a reversible mounting for the actuating handle may be provided, and different types of handles may be mounted thereon without making any change in the housing of the assembly.

Another object of this invention is to provide such a nozzle and valve assembly in which valve members are constructed so as to minimize wear and replacement, and to provide simple, reliable, and efficient operations even at very high pressures and velocities.

These and other objects of this invention are accomplished according to the preferred embodiments illustrated by providing a valve housing having an inlet, a high pressure outlet with a nozzle connected thereto, and a relief or dump outlet. A valve, including a valve seat and a valve member movable between opened and closed positions with respect to the valve seat, is provided in a valve chamber in the housing to control flow of fluid between the inlet and the high pressure and dump outlets. The mating surfaces on the valve parts are preferably flat and flow about the valve member is provided by a fluted portion which also guides the valve member. Flow through the pressure relief outlet is relatively unrestricted as opposed to flow through the nozzle, and when the valve is open, a substantial amount of the flow through the inlet is directed to and out the pressure relief outlet, which directs the dumped fluid away from the operator, thus reducing the pressure in the valve chamber. However, in order to reduce kick of the assembly, means is provided in the path of fluid flow from the inlet to the pressure relief outlet to cause the flow to pass through one or more acute angles, preferably 45° or less. In the preferred embodiment illustrated, such means is provided by passing the flow into and through a center bore in the valve seat, and then through a plurality of ports in the valve seat, each at acute angle with respect to the center bore and communicating between the center bore and the pressure relief outlet, and also by a muffler mounted on the valve housing at the pressure relief outlet which further provides for flow of the dumped fluid through an acute angle.

Since the dumped flow is diverted away from the operator, and not at his feet, a pistol-grip handle may be mounted on the bottom of the assembly. However, another feature of this invention is that the handle mounting is such that a bar or lever handle may also be used with the same mounting if desired without alternating the valve housing.

Also, in construction of the valve parts, the movable valve member is necessarily made of harder steel than the other parts, and in all cases where wear or erosion may occur in the softer parts, the valve member radially overlaps the adjacent softer part, thus reducing erosion that may occur.

Other features of the design of the valve assembly and its component parts are specifically set out in the detailed description to follow and the appended drawings which illustrate preferred embodiments of this invention and wherein like parts are designated by like reference numerals.

FIG. 1 is a view in elevation of a high pressure fluid system utilizing the nozzle and valve assembly of this invention;

FIG. 2 is an elevation view in partial section showing the preferred form of hand-held nozzle and valve assembly of this invention, and the preferred form of actuating handle, and with the valve members being shown closed;

FIG. 3 is an elevation view in partial section showing a hand-held nozzle and valve assembly substantially identical to the assembly of FIG. 2, but in which alternate forms of valve seat and actuating handle are used, and the valve members are shown as open;

FIG. 4 is a cross-sectional view taken at 4—4 in FIG. 2;

FIG. 5 is an enlarged view taken at 5 in FIG. 2;

FIG. 6 is an enlarged view taken at 6 in FIG. 2;

FIG. 7 is a cross-sectional view taken at 7—7 in FIG. 3;

FIG. 8 is a cross-sectional view taken at 8—8 in FIG. 3.

Referring now to FIG. 1, a high pressure pump P is illustrated as connected at its inlet to a source of water (not shown) and at its outlet to a hose F connected to a hand-held nozzle gun or valve assembly G. A high pressure stream W of water emerges from the nozzle of assembly G to clean the surface of an object S, for example, the hull of a ship.

The details of nozzle valve assembly G are shown in FIG. 2. Assembly G includes a valve housing 10 which may be a metal block having a cylindrical vertical bore 11 passing through it. Bore 11 includes a relatively large diameter upper portion 11A, which is threaded and open at the top of housing 10, a slightly smaller diameter portion 11B joined to portion 11A by radially extending shoulder 12, a progressively smaller diameter intermediate portion 11C joined to portion 11B by a radially extending shoulder 13, and a relatively smaller diameter lower portion 11D, open at the bottom of housing 10 and joined to portion 11C by a radially extending shoulder 14. Portions 11B and 11C of bore 11 generally form a valve chamber C in which a valve for controlling flow of fluid through assembly G is provided. Assembly G also includes a fluid inlet 15, a high pressure fluid outlet 16, and a pressure relief or dump outlet 17, all of which are in fluid communication with chamber C, the inlet being provided on the opposite side of the housing from the outlets. A valve actuator flange and handle 18, in the form of a pistol-grip and including a trigger 19, having a trigger safety 19A, is mounted on housing 10; a nozzle barrel 20 is mounted at one end on housing 10, in outlet 16, and includes a spray nozzle 21 at its other end; and a muffler housing 22 is mounted on housing 10 and in outlet 17.

In the following description, the valve assemblies, shown in FIG. 2 and FIG. 3 are identical except for details concerning the valve seat and the actuating handle, as hereafter described. For this reason, FIGS. 5, 6, 7, and 8 apply equally to both the FIG. 2 and FIG. 3 embodiments. Also, the same reference numerals are used for like parts in FIGS. 2 and 3 except that the numbers relating to the valve seat in FIG. 3 are primed.

A valve means is mounted in chamber C for controlling the flow of fluid from inlet 15 to and out outlets 16 and 17. As shown in FIG. 2, the preferred form of valve means illustrated includes a valve seat 23 including an upper threaded portion 24 threaded into portion 11A of bore 11, and a lower portion 25 disposed in chamber C and having a flat end 25A, as better shown in FIG. 5, which functions as a valve seat. Shoulder 12 is preferably beveled and an O-ring seal provided in the space between shoulder 12 and the upper portion of valve seat 23. This provides a simple and relatively inexpensive arrangement, since no groove is needed, and also gets the seal out of the way so that the discharge ports of the valve seat can have sharper angles, as hereafter described. Valve seat member 23 also includes a center bore 26 open at end 25A and passing up into portion 24 of member 25, an annular recess 27 disposed to be adjacent and in fluid communication with relief outlet 17, and a plurality of radially extending ports 28 connected between bore 26 and recess 27 and having an acute angle, preferably 45° or less, with respect to bore 26. As shown in FIG. 4, in the embodiment illustrated, six such ports are provided. A suitable seal, such as provided by an O-ring and back-up ring (see FIG. 5), is shown for sealing about the periphery of valve seat 23 between valve chamber C and outlet 17 so that fluid flowing from chamber C to outlet 17 must pass through bore 26 and ports 28.

The valve means also includes a valve member 29, details of which are also shown in FIGS. 5, 6, 7, and 8. Valve member 29 includes a flat upper end 30 which, as illustrated in FIG. 7, is fluted so that a plurality of radially extending edges 31 are provided with grooves 32, which form fluid flow passages, between them. Also, valve member 29 includes central bore 33 passing through it and in line with bore 26, and an annular recess 34 intermediate its ends and adjacent inlet 15 and outlet 16 when valve member 29 is disposed in valve chamber C. Valve member 29 is closely guided in chamber C by its ends and with the construction described, may be relatively small compared with piston types of valve members having elongated guides. Fluid from inlet 15 flows into recess 34, and when the valve is open (i.e., end 30 not seated on end 25A) through grooves 32 and into bores 26 and 33. As shown in FIG. 6, the lower portion of bore 33 is flared outwardly. Valve member 29 fits in chamber C with a close sliding fit so that it may move to and away from engagement of the flat ends 25A and 30.

Means is also provided for so moving valve member 29 in response to action by an operator. As illustrated, this means includes a cylindrical plunger or pin 35 mounted in and extending through housing 10 in opening 11D. As shown in FIGS. 2 and 6, pin 35 is tapered at its upper end to mate with the flared lower portion of bore 33 in valve member 29. Pin 35 fits with a close sliding fit in opening 11D and is sealed about its periphery with an O-ring seal 36. The lower end of pin 35, outside of housing 10, includes an enlarged head 37, and a coil spring 38 is mounted about pin 35 and between head 37 and housing 10 to bias pin 35 outwardly from housing 10. Handle flange and grip 18 is mounted by bolts 39 in the outside of housing 10 and about pin 35 extending therefrom so that the upper portion of trigger 19 engages head 37. Thus, with trigger 19 in the dotted line position shown in FIG. 2, pin 35 and valve member 29 (see FIG. 3) are shifted down to permit fluid to flow through outlet 17, thus relieving pressure in valve chamber C through outlet 17. However, when trigger 19 is actuated to the solid line position of FIG. 2, pin 35 and valve member 29 are moved upwardly to the position shown in FIG. 2, where valve member 29 is seated against valve seat 23. Fluid in chamber C must then exit by way of nozzle 21.

In FIG. 3, an alternate handle arrangement is shown in which a flange 40 is mounted by the same bolts 39 as used in mounting flange 18 to the bottom of housing 10. A bar or lever handle 41 is pivotally mounted in flange 39 to act against enlarged head 37. The relationship of the mounting bolts 39 and pin 35 is preferably symetrical so that flanges 18 and 40 can be mounted in reverse as from shown, and interchanged with each other, without making any changes in housing 10 or pin 35. With the reverse and symmetrical arrangement, the outlet 17 could be connected to a hose to dump water away from the operator, and the inlet and outlet connections reversed. By providing for interchangeability of handles, only one housing 10 need be provided for use with different handles as desired. Also, if desired, a pneumatic cylinder could be mounted on the bottom of the valve assembly to operate plunger 35 without alternating housing 10.

Another feature of this invention is the provision of means for reducing the effects of back pressure "kick" when the pressure in chamber C is relieved. As illustrated in FIG. 2 (this description also being applicable to FIG. 3), kick is reduced by providing means in the flow of relieved water through outlet 17, which causes the flow to be diverted through one or more acute angles, preferably of 45° or less. One such flow diversion is provided by the angle between central bore 26, 26' and radial ports 28, 28', especially in the FIG. 2 embodiment in which this angle is substantially smaller than in the embodiment of FIG. 3. For example, with the arrangement of ports 28 shown in FIG. 2, the angle between ports 28 and bore 26 may be approximately 30°, whereas the angle of ports 28' with respect to bore 26' in FIG. 3 is approximately 60°. Also connected to outlet 17 (but only partially shown in FIG. 3) is muffler 22. Muffler 22 includes an inner tubular member 42 threaded at an end which is screwed into outlet 17. Member 42 includes an enlarged diameter shoulder portion 43, a threaded intermediate portion 44 adjacent shoulder portion 43, and a central bore or passageway 45 passing from the end screwed into outlet 17 to adjacent the other end of member 42. Central passageway 45 is in fluid communication with outlet 17 and a plurality of ports 46, also at an acute angle with respect to passageway 45, for example 45° in the embodiment shown, are provided in the wall of member 42 and provides fluid communication between passageway 45 and the outside of member 42. Muffler 22 also includes a tubular outer sleeve 47 which is screwed at one end onto threads 44, and which is open to atmosphere at the other end. A clearance 48 is provided between the outside diameter of member 42 and the inside diameter of sleeve 47 so that fluid flowing through ports 46 flows into clearance 48 and out the open end of sleeve 47.

Thus, when valve member 29 is open, as shown in FIG. 3, to permit the pressure in chamber C to be relieved through outlet 17 and muffler 22, this flow must, in the embodiments illustrated, make two acute angle bends, one prior to reaching outlet 17, and one after leaving outlet 17. This breakup of the flow substantially reduces the effects of back pressure kick. Of course, it is to be understood that by use alone of either the muffler arrangement shown in FIG. 2, or the arrangement of the discharge ports 28 in valve seat 23 of FIG. 2, a substantial but lesser reduction in kick is provided over previous designs. In some cases, for example where lower pressures are used, this reduction in kick may be satisfactory. However, with the arrangement of valve member 23' in FIG. 3, because of the larger angles for the discharge ports, it is generally necessary to also use the muffler 22 in outlet 17 in order to get a satisfactory reduction in back pressure kick.

Another important aspect of this invention is the construction of the valve parts in a manner to substantially reduce wear generally associated with control of high pressure, and sometimes abrasive fluids. It is preferred that valve member 29 be made of a harder steel than either of valve seat 23 and actuating pin 35. As shown in FIG. 5 the radial extent of upper edge 30 of valve member 29, both inwardly and outwardly, is greater than and overlaps the radial extent of lower edge 25A of valve seat 23. Also, as shown in FIG. 6, the inner flared wall of central bore 33 extends beyond and overlaps with the upper flared end of pin 35 when in mating engagement with the wall of bore 33. In each case the harder metal part overlaps the softer metal part so that wear or erosion along the mating edges is reduced. This is particularly necessary with use of the fluted arrangement for valve member 29. Also, with the overlapping arrangement between pin 35 and the wall of bore 33, very little pressure in chamber C below valve member 29, which would tend to unseat pin 35, acts on pin 35.

Also, by use of flat surfaces 25A and 30 on the valve parts, problems of concentricity and leakages from deformation on round or tapered seats is eliminated. The fluted design of valve member 29 permits this member to be closely guided in chamber C and still provides the desired flow through it. Since valve member 29 is self guided with the recess 34 between the guides, it can be made smaller and cheaper than conventional designs and the whole valve assembly can be made with a small number of parts.

Also, unlike prior designs of high pressure control valves, there in no O-ring or other seal in the clearance 50 between the lower part of valve member 29 (between annular groove 34 and its lower end) and the wall of chamber C. A small clearance is thus provided, substantially smaller than the central bore 33. However, when the valve is closed to shut off flow through bore 33, a small flow is provided through clearance 50, and in the clearance between pin 35 and bore 11D, which is about the same as clearance 50, to act on O-ring 36 to help push pin 35 down when the handle is moved from the closed to open position. Also, during this operation, the pressure in annular groove 34 acts on a shoulder 29A in valve member 29 to also help push the valve member down. When the valve opens, and pin 35 goes down, the pressure acting on the bottom of valve member 29 is relieved through bore 33 so that the pressure acting on shoulder 29A is effective. Because of this it is not necessary to use a spring to insure that valve member 29 will always move away from valve seat 23 when the handle is released, even at the higher pressures used. Also, the clearance 50 permits relieving of pressure in annular groove 34 against shoulder 29A during closing of the valve to permit closure without difficulty.

By providing an arrangement wherein spring 38 is outside of housing 10, space is conserved in housing 10 and the size of the spring can be selected without concern as to whether or not a too large of a spring interferes with the valve parts in housing 10.

From the foregoing, it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a fluid system for supplying a high pressure stream of fluid, including a pump having a low pressure inlet adapted to be connected to a source of fluid and a high pressure outlet, and a nozzle and valve assembly adapted to be connected for fluid communication with said outlet, the improvement in said assembly comprising, in combination: a housing having a valve chamber therein, a fluid inlet in fluid communication with said chamber, a high pressure fluid outlet in fluid communication with said chamber, and a fluid pressure relief outlet in fluid communication with said chamber; valve means disposed in said chamber and actuable between a first position permitting substantial flow of fluid from said inlet to said pressure relief outlet to a second position substantially interrupting such flow of fluid while permitting flow of fluid from said inlet to said high pressure outlet, said valve means including valve seat member having a substantially flat valve seat, and a fluted valve member having a substantially flat surface for engaging said valve seat in a sealing relationship; actuating means mounted on said housing for so actuating said valve means; and back pressure control means mounted on said housing and in fluid communication with said pressure relief outlet and said fluid inlet for substantially reducing kick of said assembly when said valve means moves between said first and second positions.

2. The system of claim 1 wherein said back pressure control means includes flow diverting means for diverting fluid that passes throughout said pressure relief outlet by an acute angle.

3. The system of claim 2 wherein said valve seat member is mounted in said chamber adjacent said pressure relief outlet and between said pressure relief outlet and said inlet, and said fluted valve member is mounted in said chamber adjacent said inlet and between said inlet and said valve seat member, said valve seat member including a central bore in fluid communication with said inlet, and a plurality of radially extending bores connected between said central bore and said pressure relief outlet, said radially extending bores having an acute angle with said central bore and providing said flow diverting means.

4. The system of claim 3 wherein the said acute angle is less than 45°.

5. The system of claim 2 wherein said back pressure control means includes a muffler mounted on said housing and connected to said pressure relief outlet, said muffler having an enlarged housing with an internal bore therein open to atmospheric pressure, and wherein said flow diverting means includes an elongated tubular member mounted in said internal bore and having a central bore therein in communication with said pressure relief outlet, and a plurality of radially extending bores, each having an acute angle with respect to said central bore and communicating between said central bore and said internal bore of said muffler housing.

6. The system of claim 5 wherein said acute angle is less than 45°.

7. The system of claim 3 wherein said back pressure control means includes a muffler mounted on said housing and connected to said pressure relief outlet, said muffler having an enlarged housing with an internal bore therein open to atmospheric pressure, and wherein said flow diverting means further includes an elongated tubular member mounted in said internal bore and having a central bore therein in communication with said pressure relief outlet, and a plurality of radially extending bores, each having an acute angle with respect to said central bore and communicating between said central bore and said internal bore of said muffler housing.

8. The system of claim 3 wherein the radial edges of said seat member are substantially overlapped by the radial edges of said valve member.

9. The system of claim 8 wherein said valve member is fluted adjacent its end that seats against said valve seat member, and the radial edges of said fluted portion guide said valve member in said valve chamber, and the grooves between said radial edges of said fluted portion provide fluid communication through said fluted portion.

10. The system of claim 1 wherein said actuating means includes a pin passing from adjacent and in abutment with said valve means, through said housing spring, means for urging said pin out of said housing, a flange mounted on the outside of said housing and about said pin, and including mounting bolts symmetrically located in said flange and said housing, and a trigger means mounted on said flange and in engagement with said pin.

11. The system of claim 10 wherein said trigger means includes a pistol-grip handle formed with said flange and a trigger pivotally mounted in said pistol-grip handle for actuating said pin.

12. A hand-held nozzle and valve assembly for controlling the flow of fluid in a high pressure fluid system, comprising, in combination: a housing having a valve chamber therein, a fluid inlet in fluid communication with said chamber, a high pressure fluid outlet in fluid communication with said chamber, and a fluid pressure relief outlet in fluid communication with said chamber; valve means disposed in said chamber and actuable between a first position permitting substantial flow of fluid from said inlet to said pressure relief outlet to a second position substantially interrupting such flow of fluid while permitting flow of fluid from said inlet to said high pressure outlet; actuating means mounted on said housing for so actuating said valve means; and back pressure control means mounted on said housing and in fluid communication with said pressure relief outlet, and said fluid inlet for substantially reducing kick of said assembly when said valve means moves between said first and second positions, said back pressure control means including flow diverting means for diverting fluid that passes throughout said pressure relief outlet by an acute angle.

13. The system of claim 12 wherein said valve means includes a fixed valve seat member mounted in said chamber adjacent said pressure relief outlet and between said pressure relief outlet and said inlet, and a movable valve member mounted in said chamber adjacent said inlet and between said inlet and said valve seat member, said valve seat member including a central bore in fluid communication with said inlet, and a plurality of radially extending bores connected between said central bore and said pressure relief outlet, said radially extending bores having an acute angle with said central bore and providing said flow diverting means.

14. The system of claim 13 wherein the said acute angle is less that 45°.

15. The system of claim 12 wherein said back pressure control means includes a muffler mounted on said housing and connected to said pressure relief outlet, said muffler having an enlarged housing with an internal bore therein open to atmospheric pressure, and wherein said flow diverting means includes an elongated tubular member mounted in said internal bore and having a central bore therein in communication with said pressure relief outlet, and a plurality of radially extending bores, each having an acute angle with respect to said central bore and communicating between said central bore and said internal bore of said muffler housing.

16. The system of claim 15 wherein said acute angle is less than 45°.

17. The system of claim 13 wherein said back pressure control means includes a muffler mounted on said housing and connected to said pressure relief outlet, said muffler having an enlarged housing with an internal bore therein open to atmospheric pressure, and wherein said flow diverting means further includes an elongated tubular member mounted in said internal bore and having a central bore therein in communication with said pressure relief outlet, and a plurality of radially extending bores, each having an acute angle with respect to said central bore and communicating between said central bore and said internal bore of said muffler housing.

18. The system of claim 13 wherein the mating surfaces of each of said valve seat member and said movable valve member are substantially flat and the radial edges of said seat member are substantially overlapped by the radial edges of said valve member.

19. The system of claim 18 wherein said valve member is fluted adjacent its end that seats against said valve seat member, and the radial edges of said fluted portion guide said valve member in said valve chamber, and the grooves between said radial edges of said fluted portion provide fluid communication through said fluted portion.

* * * * *